(12) United States Patent
Dirr

(10) Patent No.: US 7,088,786 B2
(45) Date of Patent: Aug. 8, 2006

(54) PROCESS FOR THE TRANSMISSION OF ANALOG AND DIGITAL INFORMATION

(76) Inventor: Josef Dirr, Neufahrner Strasse 5, D-81679, Munich (DE)

( * ) Notice: Subject to any disclaimer, the term of this patent is extended or adjusted under 35 U.S.C. 154(b) by 372 days.

(21) Appl. No.: 10/628,596

(22) Filed: Jul. 28, 2003

(65) Prior Publication Data

US 2004/0223563 A1 Nov. 11, 2004

(30) Foreign Application Priority Data

May 5, 2003 (DE) ................................. 103 20 229
Jun. 2, 2003 (DE) ................................. 103 24 862

(51) Int. Cl.
*H03C 3/00* (2006.01)
*H03K 7/06* (2006.01)
*H04L 27/12* (2006.01)
(52) U.S. Cl. .................... 375/302; 375/240.01
(58) Field of Classification Search ................. 375/302
See application file for complete search history.

(56) References Cited

U.S. PATENT DOCUMENTS

| 4,675,721 | A |   | 6/1987  | Dirr     | 358/13   |
|-----------|---|---|---------|----------|----------|
| 4,731,789 | A |   | 3/1988  | Thornton | 372/45   |
| 4,731,798 | A | * | 3/1988  | Dirr     | 375/260  |
| 4,794,621 | A |   | 12/1988 | Dirr     | 375/52   |
| 4,947,483 | A | * | 8/1990  | Dirr     | 370/295  |
| 5,587,797 | A |   | 12/1996 | Dirr     | 358/261.1|
| 6,038,262 | A | * | 3/2000  | Ganter   | 375/296  |
| 6,072,829 | A |   | 6/2000  | Dirr     | 375/239  |

* cited by examiner

*Primary Examiner*—Stephen Chin
*Assistant Examiner*—Curtis Odom
(74) *Attorney, Agent, or Firm*—Nields & Lemack

(57) ABSTRACT

Process for the transmission of analog and digital information. The object of the invention is the transmission of both analog-coded and digital-coded information only with an alternating current of one frequency and one phase position. This is accomplished in accordance with the invention in such a way that the carrier of the analog and digital information to synchronize the periods or half-periods of an uninterrupted sequence, so that, as needed, the periods or half-periods can be employed in sequence. In a real-time transmission, the analog periods or half-periods have to be the same number as the code words of the digital information. Such a transmission affords a substantial simplification. Thus, in color television, for example, the luminance signal can be transmitted in an analog manner and the color signal can be transmitted in series in a digital manner. Thus, no phase problems arise. The receiver can be designed as a superheterodyne radio receiver up to the decoder.

8 Claims, 9 Drawing Sheets

$$U_{AM}(t) = \hat{U}_T \cdot \sin\omega_T t + \frac{m}{2} \cdot \hat{U}_T \cdot \cos(\omega_T - \omega_M)t - \frac{m}{2} \cdot \hat{U}_T \cdot \cos(\omega_T + \omega_M)t$$

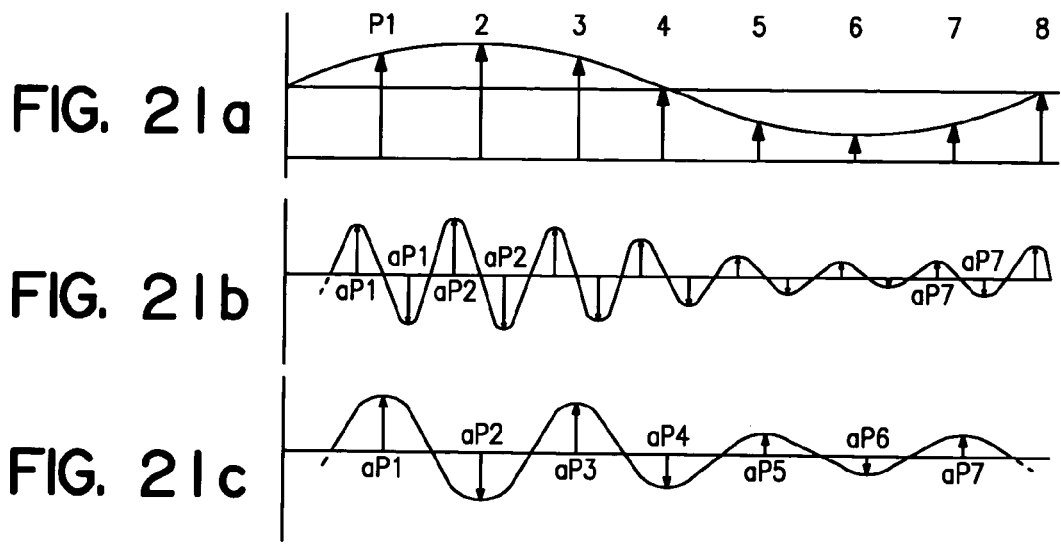
FIG. 21a
FIG. 21b
FIG. 21c
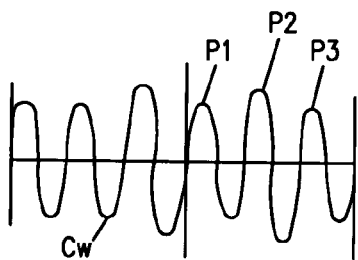
FIG. 22
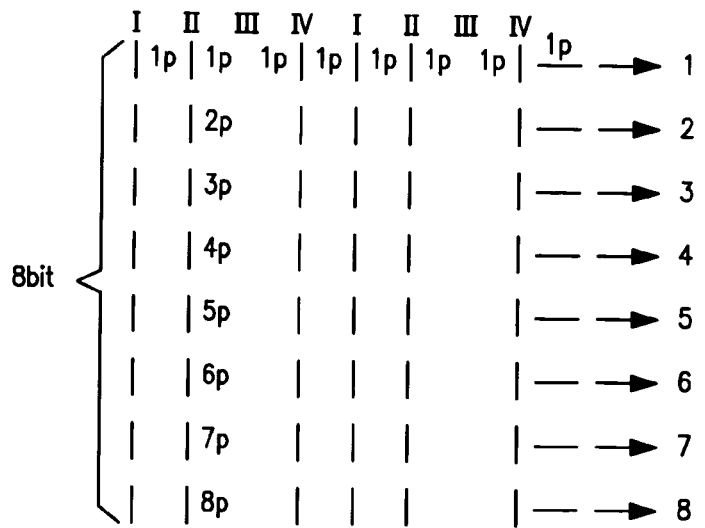
FIG. 23

PROCESS FOR THE TRANSMISSION OF ANALOG AND DIGITAL INFORMATION

This application claims priority of German Patent application Nos. 103 20 229.3 filed on May 5, 2003 and 103 24 862.5 filed on Jun. 2, 2003, the disclosures of which are hereby incorporated by reference.

TECHNICAL FIELD

The present invention concerns the transmission of analog and digital information via one channel.

PRIOR ART

Known is the transmission of analog information only by means of an alternating current of one frequency and phase position (Japanese Patent No. 2 107,582). In it, the analog samples are transmitted on the half-waves or periods of an alternating current at the sampling frequency (in the case of periods). The amplitudes of the periods are then identical to the sampling amplitudes. Digital codings are also known, in which the half-waves or periods of an alternating current of the same frequency and phase position are provided for coding. In this process, the levels are formed by, for example, the number, length, time, or phase position of the periods (e.g., the patents, U.S. Pat. No. 5,587,797, U.S. Pat. No. 6,072,829).

Further known is the asynchronous transfer mode (ATM), which is based on a connection-oriented packet switching process. In it, all useful information and control information of a source is distributed in packets of fixed length, namely, the cells. This sequence of cells makes up a stream of digital information. The number of cells assigned to a source then determines the bandwidth. Before a connection is made in the network, this bandwidth is to be requested. A cell header contains the control information. In a coupled network, it is also possible for cells to overtake one another, resequencing mechanisms being required to eliminate this. A drawback of this technique is a great hardware expense. A buffer is required when the physical path of the current no longer provides the bandwidth.

Further known for codings with alternating currents of the same frequency and phase position is the provision of filling elements for the code words in order to achieve a synchronization with the sampling frequency.

However, this is accompanied by an expansion of bandwidth.

SUMMARY OF THE INVENTION

It is often useful to transmit both analog and digital information via one channel—for example, in the case of transmission of a color television signal. Here, however, PAM impulses are not used on account of an unfavorable interference ratio and a pulse-dependent frequency band expansion. In the invention, this is avoided by transmitting the samples on the amplitudes of the half-waves or periods of an alternating current.

Analog codings through the half-periods or periods of an alternating current of the same frequency have already been disclosed in U.S. Pat. No. 4,675,721. For the coding of digital information, an alternating current of one frequency and phase position is also provided. Thus, it is possible, by means of an alternating current of the same frequency and phase position to transmit analog and digital information in a serial manner.

This invention can also be applied advantageously to color television, because, for example, it is not necessary to transmit as well the redundancy and irrelevance, that is, superfluous data that cannot be perceived visually. Thus, it suffices when the luminance signal undergoes analog transmission and the color signal undergoes serial digital transmission with the half-periods or periods of an alternating current of the same frequency. This can occur directly by means of the carrier or by means of the upper or lower frequency band. Here, the receivers become as simple as a superheterodyne radio receiver up to the picture tube.

The invention offers unanticipated possibilities for the encoding of information. Through the mixing of analog-coded periods with digital-coded periods, namely, in a non-periodic manner, a decoding is not possible.

BRIEF DESCRIPTION OF THE DRAWINGS

FIG. 21: Principle of PAM and the transmission of periods or half-periods.

FIG. 22: Serial arrangement of code words and PAM samples coded with periods of an alternating current.

FIG. 23: Application of the invention in multichannel operation.

The methods on which this invention is based will firstly be described in greater detail. The greater the number of stages or steps in the code, the more information that can be transmitted, as can be seen from the following table:

| No of stages: | No of places: | Combinations: | Bits: |
|---|---|---|---|
| 2 | 2/3/4/5 | 4/8/16/32 | 2/3/4/5 |
| 3 | " | 9/27/81/243 | 3/4/6/7 |
| 4 | " | 16/64/256/1024 | 4/6/8/10 |
| 5 | " | 25/125/625/3125 | 4/6/9/11 |
| 6 | " | 36/216/1296/7776 | 5/7/10/12 |

If 2 90°-phase-shifted alternating currents of the same frequency, which are added for the transmission (OAM), are used for encoding, that gives 4×4=16 stages.

In the case of carrier frequency transmission because of the 1/6 power it is advantageously possible to use the single sideband method. As in accordance with the carrier formula:

$$\mu_{AM}(t) = \overline{\mu}_T \cdot \sin\omega_T t + \frac{m}{2} \cdot \overline{\mu}_T \cdot \cos(\omega_T - \omega_M)t - \frac{m}{2} \cdot \overline{\mu}_T \cdot \cos(\omega_T - \omega_M)t$$

the modulation amplitude is not also involved in the frequency, that affords narrow-band transmission.

Figure 1:
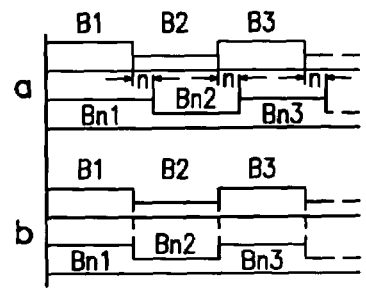
FIGS. 1, 2, 3: Principle of phase and duration pulse coding.

The phase principle:

With this principle the phase positions of pulses for example with respect to a reference pulse or the positive or negative difference with respect to the preceding pulse are provided as stages or steps. In FIG. 1 the reference phase is the pulse B1, B2, B3, ... As FIG. 1a shows the pulses Bn1, Bn2, Bn3 are phase-shifted by the amount n. In FIG. 1b the pulses BN1, BN2, BN3 involve the same phase. That phase code would therefore have 2 stages Bn and BN. Those pulses are represented by integral half-periods or periods of the same frequency.

Figure 2:
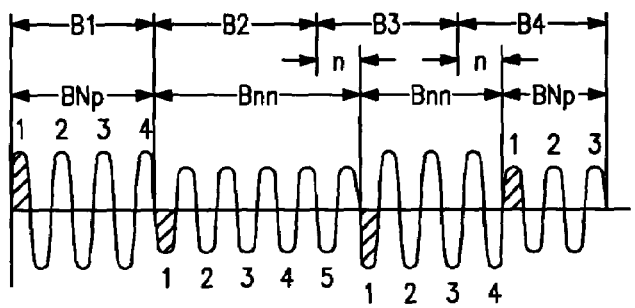

FIG. 2 shows such an encoding situation. 4 periods are associated with the reference pulse. The first pulse BNP therefore has 4 periods. If the following pulse should be trailing, it must have 5 periods. The second pulse Bnn therefore trails by the amount n. If the third pulse should remain trailing, it must contain 4 periods. The fourth, pulse should again be in phase with the reference pulse, this, is achieved in that, it has a period fewer, that is to say 3 periods. It will also be seen that each following pulse has a change in amplitude. A doubling in the number of stages can be achieved by the pulses being caused to begin on the one hand with a positive half-period and on the other hand with a negative half-period. This is shown hatched in the drawing. That therefore then gives at place 2, 4 stages (European patent No. 0 953 246 B1).

Figure 3:
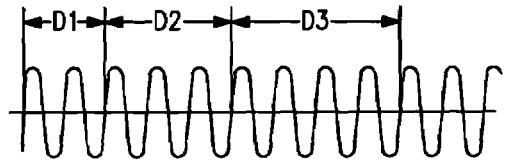

The pulse duration, principle:

This principle involves using various pulse durations or pulse duration differences as stages or steps. FIG. 3 shows 3 pulse durations, D1, D2 and D3, that is to say 3 stages. It also represents a code word having 3 places or digits. The place 1 can occupy the stages D1, D2, D3, the place 2 can occupy the stages D2, D1, D3 and the place 3 can occupy the stages D3, D1, D2. With 3 stages and, 3 places that gives 3 to the power 3 combinations, that is to say 3×3×3=27 combinations. If in addition the positive and negative beginning of the stages or code elements are used, that gives 6 stages. With 3 places, that then gives 216 combinations. QAM can also be used. The encoding alternating current can also be provided as a transmission alternating current.

Figure 4:
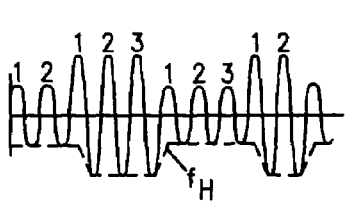
FIGS. 4, 5: Principle of envelope curve change.
Figure 5:
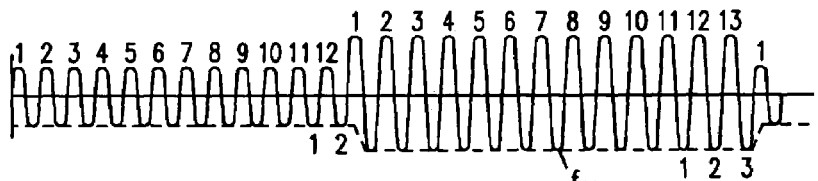

How is the feature 'flexibility of the band widths' which is particularly emphasised in the ATM procedure achieved with the present methods? That can be done in a very very simple way. The changes in amplitude also give rise to an envelope curve. FIG. 4 shows such a curve with 2 and 3 periods as stages. In this case fH is the envelope curve. In FIG. 5 in contrast the stages are 11, 12 and 11, 12, 13 periods. In the case of both stages, there are 10 periods as filling elements. It will be seen there that the frequency of the envelope curve is much smaller, that is to say the band width is also smaller. The band width can therefore be determined by means of the filling elements. This does not require any change in the encoding frequency.

Figure 7:
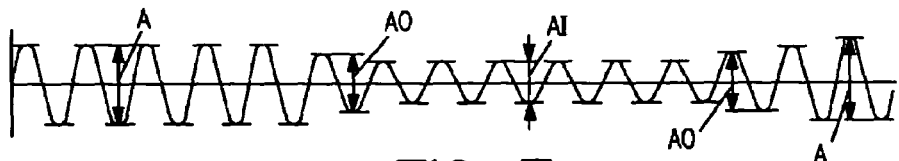
FIG. 7: Principle of a soft amplitude change.
Figure 6:
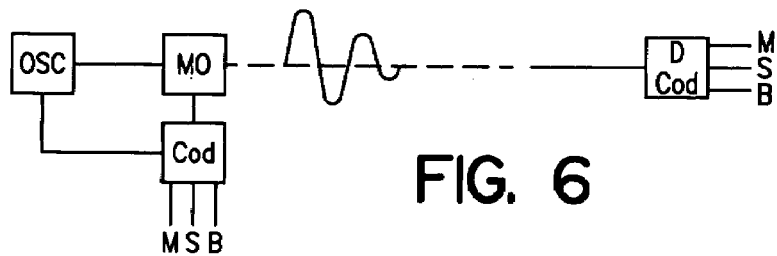
FIG. 6: Principle of switching to different modes of transmission.

As regards also the bit rates, these can be controlled in a highly flexible manner. It will be apparent from FIGS. 1 to 3 that it is possible to provide any amount of stages without the encoding frequency having to be altered. Depending on the respective transmission mode, speech, data images, the code words can be accurately matched to the required number of bits, and that naturally also applies in regard to ATM. The principle is shown in FIG. 6. The encoding frequency is generated in the oscillator OSC and fed to the modulator MO. Depending on whether music, speech or image or television is to be transmitted, marked by the feed M, S, B at the encoder, the appropriate stages and code words are passed to the modulator—in actual fact only one respective period counting procedure and amplitude switching operation is necessary. That avoids redundancy. The number of bits of the code words is therefore precisely adapted to the respective transmission mode. The code words are then decoded in the decoder D Cod and converted into the respective analog values of M or S or B. FIG. 7 shows a gentle amplitude switching operation. Between the amplitudes A and AI there is also a period involving the transitional amplitude AÜ.

Figure 9:
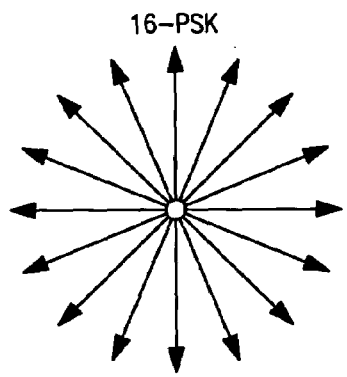
FIG. 9: A 16 PSK diagram.
Figure 8:
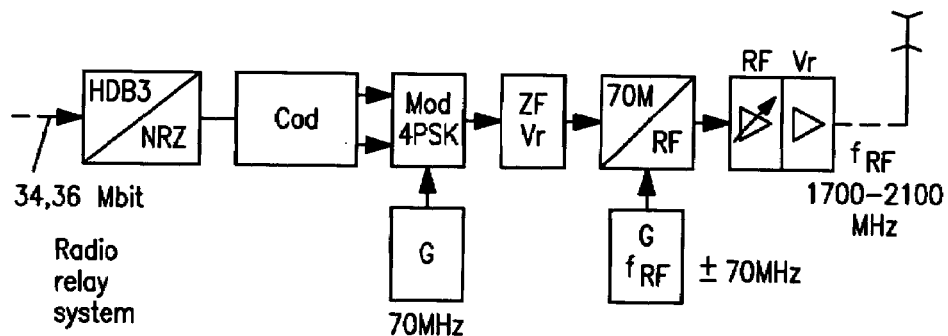
FIGS. 8, 11: Principle of a conventional radio relay system and of one in accordance with the invention.
Figure 11:
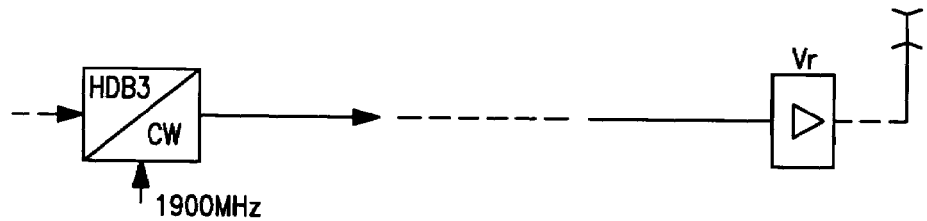

In order to demonstrate how great the information density is with that method, a comparison is made with a radio relay system, the circuit in principle of which is shown in FIG. 8. This is designed for 34,368 Mbits. The band width is 1700–2100 MHz with 4 PSK encoding. It will be seen that the hardware is very expensive. With a code as shown in FIG. 1–3 or 4 the predetermined band width would not be sufficient. Filling elements therefore have to be provided. With 4 stages with 10, 11, 12 and 13 periods on average 11.5 periods are required for a code element. For a 4-digit code word 4×11.5=46 periods are then required. Assuming that 1900 MHz is the encoding frequency, that then gives 1900:46=41.3 M code words/s. With one code word there is 4 to the power 4=256 combinations, that is to say 8 bits. With 41.3 M code words that is 41.3×8=330 Mbits/s. That therefore involves 9.6 times more bits than in the conventional radio relay system. With a doubling of the stages, as set forth in FIG. 2, that then gives 8 stages. With 4 places that gives 8 to the power 4=4096 combinations=12 bits. With 41.3 code words that is 495.6 Mbits/s. That is 14.4 times as many as in the radio relay system involving conventional encoding. If the encoding procedure involves the use of 2 alternating currents at 1900 MHz which are phase-shifted relative to each other through 90° and which are added upon transmission (OAM), that gives 8×8=64 stages. With a code word involving 2 places, that gives 12 bits. Then on average 23 periods are necessary per code word so that at 1900 MHz 82.6 M code words are obtained, this is then 991 Mbits/s, that is to say 28.8 times more than in the radio relay system. Counting members are primarily required in the encoding and decoding procedures. To compare how simple that code is, FIG. 9 shows a diagram of a 16-stage phase encoding procedure. FIG. 11 shows the principle of a radio relay system according to the invention. The signal arriving with the HDB3 code is converted in the code converter into the code according to the invention and forwarded directly to the transmitting amplifier Vr and to the antenna.

Figure 10:
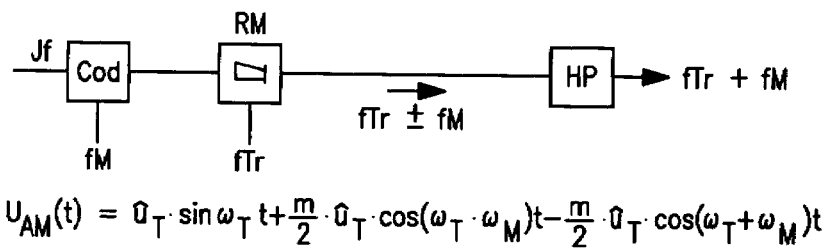
FIG. 10: Application of the invention in the case of EB.

FIG. 10 shows carrier transmission on a single sideband basis. The information Jf is encoded in the encoder Cod with the encoding alternating current fM and modulated in the ring modulator RM with the alternating current fTr. The carrier +/− modulation frequency is at the output of the ring modulator. In the example the lower sideband is filtered out with the high pass filter HP so that only the upper sideband which in fact also contains all the information is transmitted. As can be seen from the carrier formula modulation amplitude is not also involved in the frequency.

Figure 14:
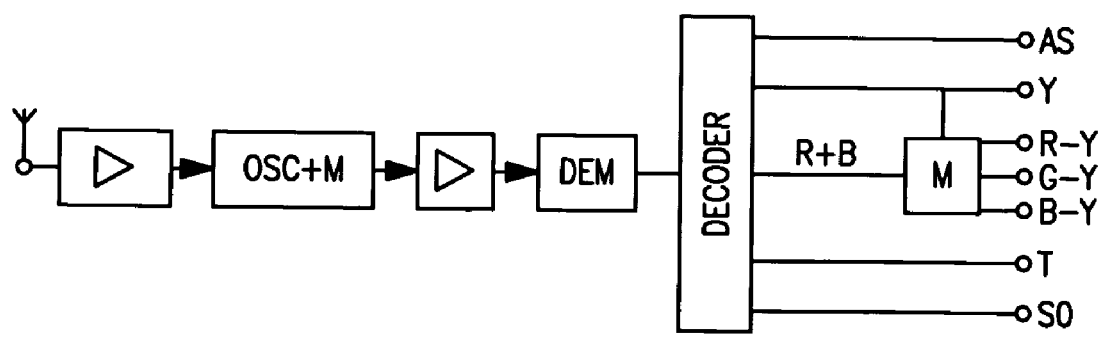
FIG. 14: Principle of a television receiver in the case of single-carrier signal transmission.
Figure 16:
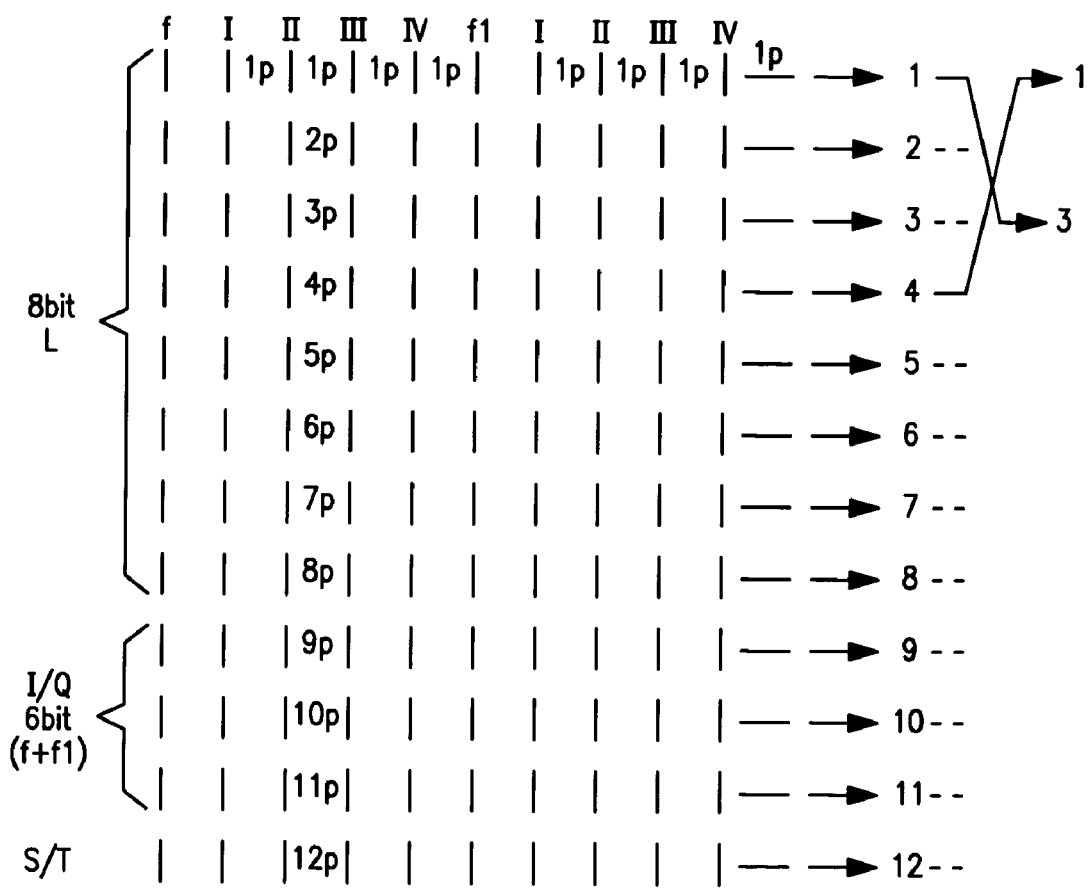
Figure 17A:
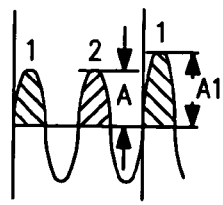
FIGS. 17, 18: Examples of Coding Scheme.
Figure 17C:
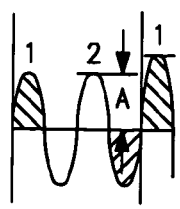

Represented in FIG. 16 f fl, . . . is a coding of a color television signal. The luminance samples L are assigned 8 bits. Assigned to each of 4 luminance samples is 1 color sample I/Q or red/blue, each with 6 bits. Appended to each luminance sample of 8 bits are 3 bits for the color coding. Provided for the voice and control signals is 1 bit S/T. Thus, 12 bits have to be coded for each sample. One carrier suffices for the transmission. Therefore, in accordance with FIG. 14, the television receiver can be designed as a superheterodyne radio receiver up to the decoder. In the decoder, then, the signals are separated according to their functions. The color difference signals are then generated through the matrix M.

Figure 13:
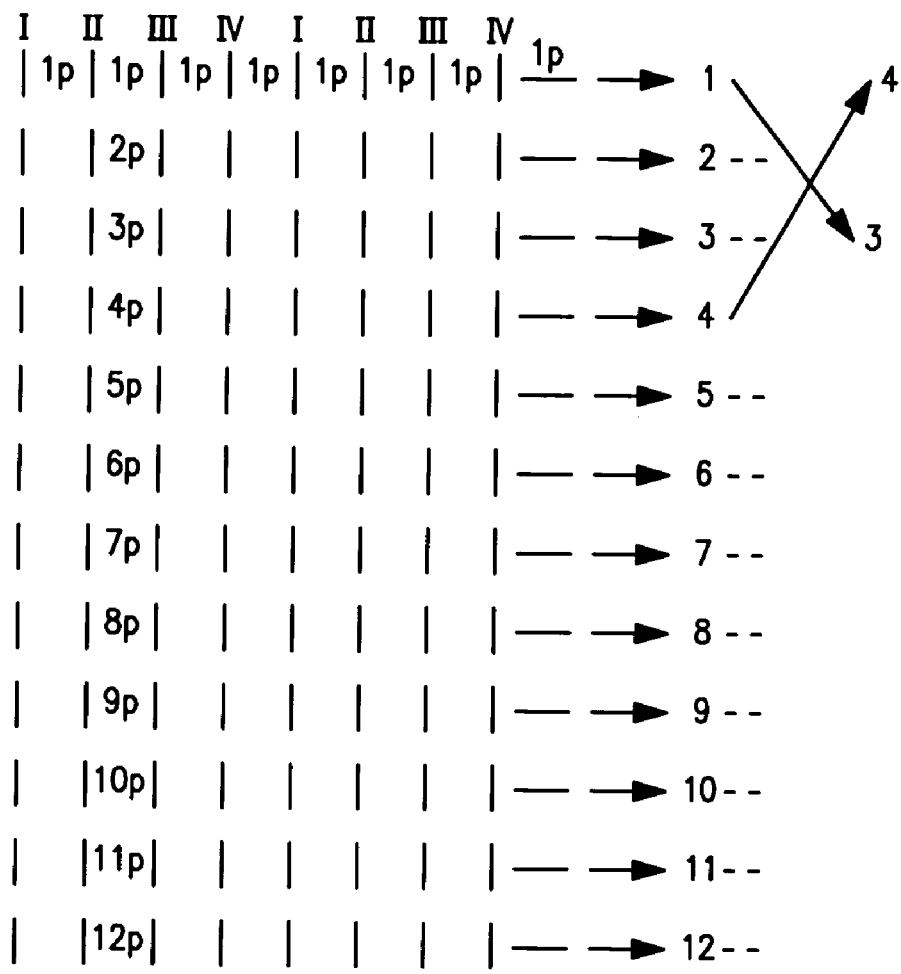
FIGS. 13, 16: A flexible packet- and channel-oriented transmission.
Figure 15:
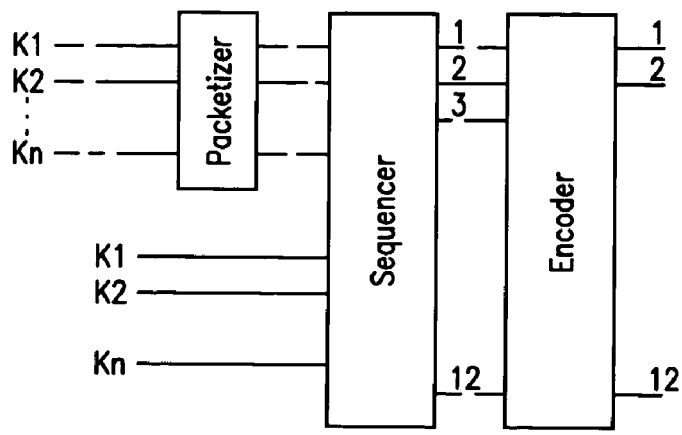
FIG. 15: Packet and real-time transmission.

Represented in FIG. 13 is an example of the decoding in accordance with the invention. Virtual code words are formed from the code words I, II, III, IV, I, II, . . . with the code elements $1p$–$12p$. The channels 1–12 are formed in a serial manner with respect to the code elements. Thus, each channel can transmit code words in a serial manner. Via the channel 1, it is possible, for example, to transmit digital voice channels with 8 bits or else mixed code words of any bit number. The transmission of the channels takes place, however, with the virtual code words I, II, . . . with constant bits. The transmission can take place with any code, such as, for example, PSK, QAM, or with the code described. A further possibility of encoding consists in swapping channels or code words or code elements between the channels; for example, the information of channel 1 is given to channel 3 or that of channel 4 is given to channel 1. A further encoding is afforded by the sequencer, as represented in FIG. 15. In order to exploit, for example, voice pauses, data, for example, are inserted into the gaps. The channels K1, K2, . . . Kn/sequencer are provided for the real-time transmission, while the data of the channels K1, K2, . . . Kn/packetizer are provided for the packet transmission.

The difference between the arrangement of FIG. 13 and that of FIG. 16 is that, in FIG. 16, real code words are also provided parallel to the virtual code words. In real-time transmission, this allows a real code word to be inserted between the virtual code words in, for example, the rhythm of the television samples. f, fl, . . . are the real code words of the television samples. For the real code words of the channels 1–12, then, the code elements f, fl, . . . are not utilized.

Figure 18A:
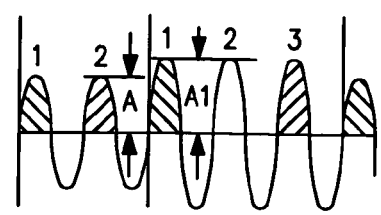
Figure 17B:
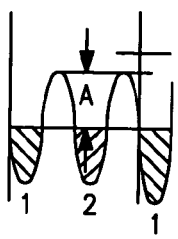
Figure 17D:
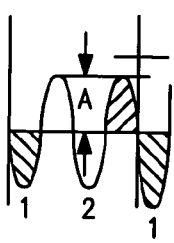
Figure 18B:
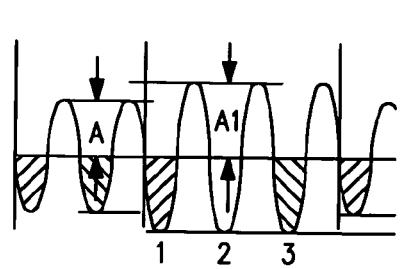

A level increase takes place in FIG. 17 and 18, in that, for processes in which the code elements are formed from the number, length, or phase position of elements and, at the same time, are sent in a periodic sequence, the combination of the positive or negative beginning or end of a code element is provided as further level. The principle of this coding is evident from the description of FIG. 2 to 5. From FIG. 17a, it is evident that the beginning and the end of the code element is positive; in FIG. 17b, it is negative, in FIG. 17c positive/negative, and in FIG. 17d negative/positive. Thus, with the code element of FIG. 17, it is possible to form 4 levels. Represented in FIGS. 18a, b is a 2-place code word, once with 2 and once with 3 periods. By means of this method it is also possible to produce 4 levels with the code element having 3 periods. When a coding with 10, 11, 12, and 13 periods as levels is used, as presented in the description of FIG. 11, one obtains, in place of 4 levels, 16 levels, that is, 16 to the power 4 combinations or 65,536 combinations=16 bits. For 41.3 M code words, one then obtains 41.3×3×16=660.8 Mbit and thus a substantial increase in the transmission density.

Figure 12:
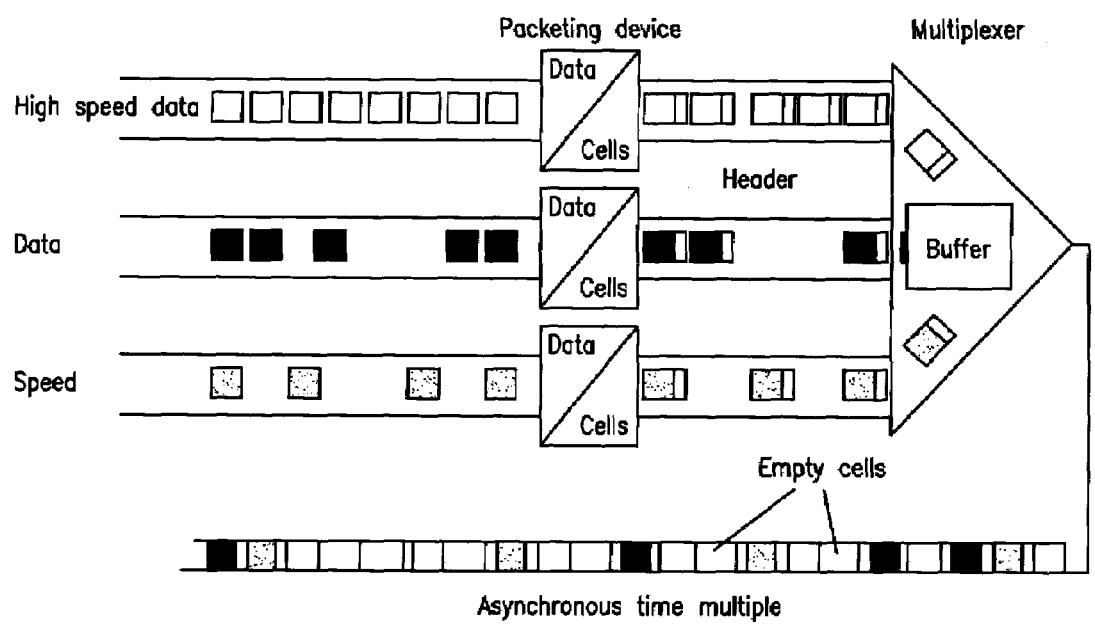
FIGS. 12, 19: Principle of the ATM technique and application in accordance with the invention.

Represented in FIG. 12 is the principle of the ATM technique. In this technique, data of differing kinds of transmission, such as high speed, data, voice, are packed in cells of the same length, each provided with a cell header and arranged in series through a multiplex device and transmitted asynchronously. In the cell header (header) is coded addressing information that is required for the respective cell.

In the arrangements of FIGS. 17, 18, it is also possible to provide additional amplitude levels, such as those disclosed in the patents, U.S. Pat. No. 5,587,797.

Figure 19:
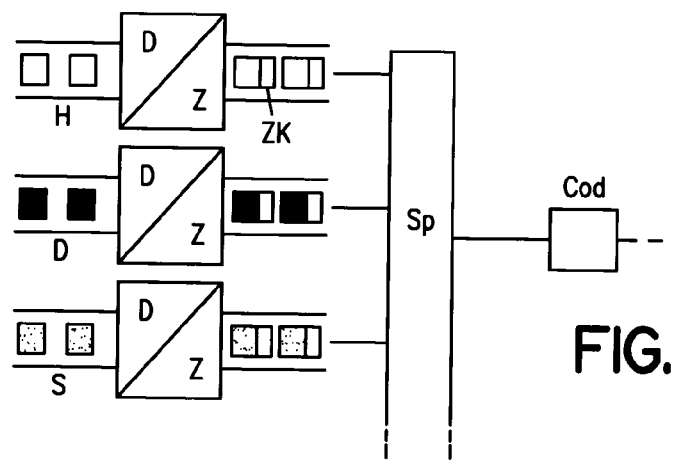
Figure 20:
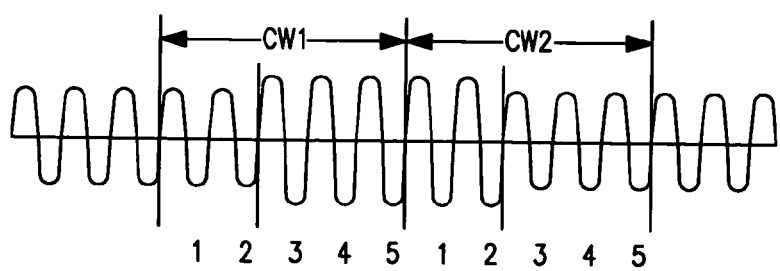
FIG. 20: Reduction of the envelope frequency.

Represented in FIG. 19 is the principle of the ATM technique for the application in accordance with the present invention. High speed data H, data D, and voice S can be sent in an uninterrupted sequence. In the packetizer P, the data D are converted into cells Z and provided with a cell header ZK. The data are then conveyed via the memory Sp to the encoder Cod. The real code words thereby formed are then placed in a predetermined fashion among the virtual code words. Through predetermined exchange of the placing, a further encoding is obtained. The transmission of the virtual code words can take place with any code. However, a code based on QAM and PSK is subject to disturbance, whereas a coding with an alternating current of one frequency and phase position is advantageous, as already described. In this regard, an especially advantageous code is represented in FIG. 20. Here, the coding takes place once again with an alternating current of one frequency and phase position. In it, only 2 length levels can be provided in one code word. The code word must always have the same length. A level increase is possible on an amplitude basis and/or through a positive or negative beginning or end of a code word in accordance with FIGS. 2, 17, and 18. Through such a coding, it is possible to synchronize sampling and coding frequency. Because the following code element in the code word is always characterized by an amplitude change, it is possible to decrease the envelope frequency by tagging the last code element of a code word with the 1st code element of the following code word with the same amplitude. In FIG. 20, the code words CW1 and CW2 are tagged with the code elements 2 and 3 periods. Thus, it is possible to provide the code element 3 periods of CW1 with the code element 2 periods of CW2 having the same amplitude tagging. The envelope curve frequency thus becomes smaller. Because the code words have the same length or period number, the analysis can take place by counting. Such a coding affords a further encoding. Also afforded is a great degree of transmission security.

FIG. 21a shows a bipolar PAM. The values P1, 2, 3, . . . are transmitted on the periods of an alternating current of the same frequency and phase. The frequency corresponds to the sampling frequency of FIG. 21a. If the PAM values are transmitted on the half-periods, then the alternating current has half the frequency of the sampling frequency, as represented in FIG. 21c. Represented in FIG. 22 is how it is possible to transmit both analog and digital information in a serial manner via one channel. The digital code word always consists of only 3 periods. In order to achieve synchronization, the analog code word with 3 periods must now be formed. To this end, the samples P1, P2, P3, that is, aP1, aP2, aP3 of FIG. 21b, are required. Naturally, the CW and PAM frequencies have to be tuned to each other—if need be, an intermediate memory is required. On the basis of FIG. 22, it is possible not only to transmit digital and analog information, but also to bring about an encoding. The insertion of a predetermined analog text—for example, a song—would already afford an encoding. It is also possible to conduct an encoding in such a way that, for example, an analog period is always appended to the code word CW. In addition, the sequence of analog periods can be changed in the code word. Here, there exist many variants.

As already described in FIGS. 13 and 16, it is possible, by means of an alternating current code, in which the levels are formed through the number of periods or the length or time or duration of the periods, to provide a multichannel system.

Thus, virtual code words are formed. In FIG. 23, 8 bits are tagged for each code word. The code elements are constructed in a binary manner. These are transmitted with an alternating current code (e.g., FIG. 2, FIG. 4). How is it then possible to transmit analog-constructed periods? It is assumed that 8 periods are required for the coding of 8 bits. The virtual code words III/FIG. 23 are to be transmitted in an analog manner. Then, 8 analog periods are inserted in series—for example, aP1 to aP8 of FIG. 21a/b. The coding alternating current of 8 samples is then an uninterrupted sequence of 8 periods of the same synchronized frequency with the digital coding. Just as in FIG. 22, the analog code words can be provided for the encoding. The spacing of the virtual code words depends on the transmission frequency and on the sampling frequency. If need be, memories must be provided. The transmission density can be further increased if QAM is used. This can also be provided for the transmission of the virtual code words. In FIG. 22, the periods P1, P2, P3 are the codings of the samples of FIG. 21a. Here, one could also, at the same time, code P1 of 3 parallel channels, namely, in a correspondingly phase-shifted manner. The analog code words III provided between the virtual code words in FIG. 23 can also be provided for the coding and transmission of 8 parallel analog channels. It is useful, then, to store the respective values and to sample them in a time-alternating manner for the transmission. On this basis, it is possible to achieve digital and analog transmission of a large amount of information through one channel.

Figure 24:
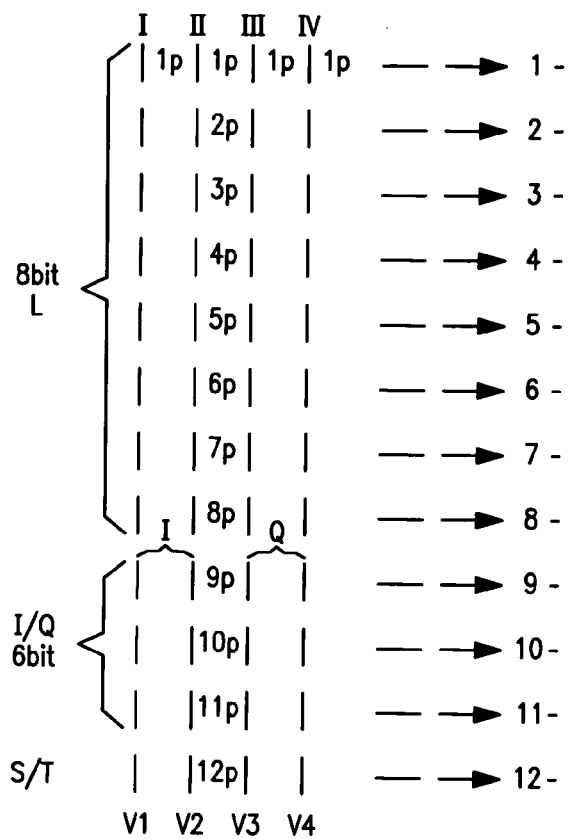
FIGS. 24, 25, 26: Principle of division of virtual code words.
Figure 25:
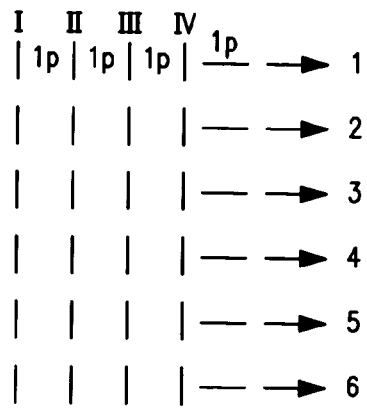
Figure 26:
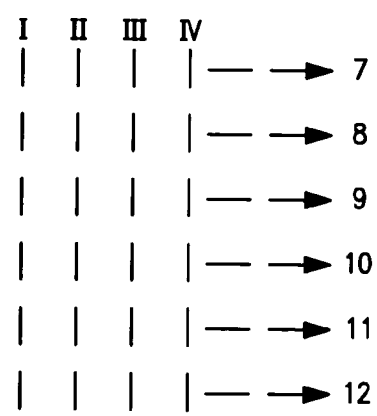

Represented in FIGS. 24, 25, 26 is the principle of a special encoding. As already presented in FIGS. 13 and 16, it is possible, as illustrated once again in FIG. 24, to store information in real code words and transmit it with virtual code words. In this process, in series to the parallel code elements 1p–12p, that is, the virtual code words V1, V2, V3 . . . , channels 1–12 are formed. In these, the digital real code words are stored. The use of real and virtual code words already affords an encoding. FIGS. 25 and 26 further disclose an additional encodings The code elements of the virtual code words are divided into 2 or more code words. This can take place, for example, through the division of the code element into 2 or more parts. For example, every 2nd or 3rd code element can be condensed into a code word and, in addition, be exchanged with divided code words of other virtual code words. In FIG. 25, the code word VI is divided into I/I and the code word V2 into II/II and, in FIG. 26, V2 is divided into III/III and IV/IV.

Figure 27:
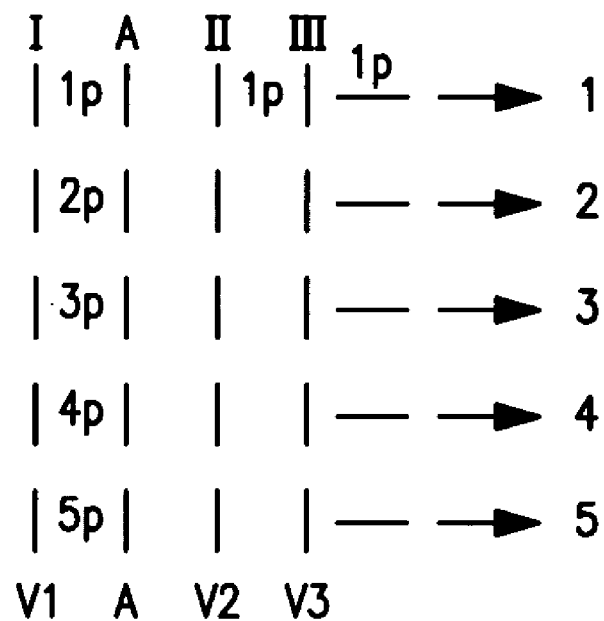
FIGS. 27, 28: Explanation of the invention in connection with the Telegraph Alphabet No. 2.
Figure 28:
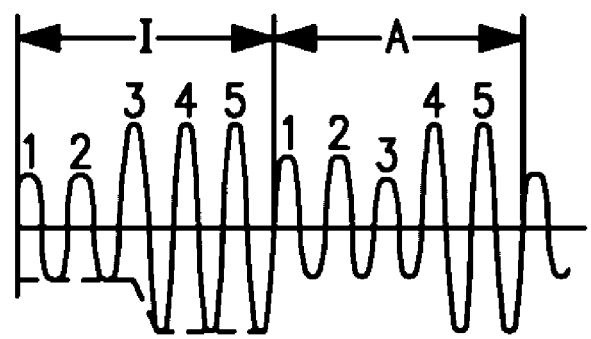

On the basis of FIGS. 27 and 28, the insertion of analog code words between the virtual code words with the International Telegraph Alphabet No. 2 is described in more detail. In this, 32 symbols are coded with 5 binary code elements. The two states of the respective code element are tagged by a small and large period of an alternating current of predetermined frequency and phase. In FIG. 27, these code elements are 1p–5p. In series to this are formed the channels 1 to 5, in which real code words are arranged—for example, I/1p, II/1p, III/1p, . . . Between the virtual code words V1 and V2 is inserted, in this example, an analog code word A. The virtual code word is tagged in each case with 5 periods. In consequence of this, the analog code word also has to be inserted with 5 periods of the same frequency and the same phase synchronously with the virtual alternating current. These can be 5 PAM periods aP of one channel of FIG. 21b or else each can be 1 sample of 5 parallel analog channels. If need be, a storage of these PAM samples is necessary in order to arrange them in the analog code word at the right time. Represented in FIG. 28 is an example for the transmission of virtual and analog code words. I is the virtual code word. The periods 1, 2, 3, 4, and 5—namely, 1, 2 with small amplitude and 3, 4, 5 with large amplitude—characterize one specific combination of 32 code combinations. The analog code word A also has 5 periods. The amplitudes correspond to the PAM samples; these are analog. The amplitudes 1, 2, 3, 4, and 5 can be of different magnitude. It is useful for the largest and the smallest analog amplitude to be set so that it falls between the smallest and largest values of the digital coding.

If, at some time, larger bit numbers are required, 2 or more virtual code words can be added. This can also be applied to any other code, such as PSK and QAM.

A further encoding is accomplished by arranging the channels 1–12 of FIG. 24 in the way represented in FIG. 25 and FIG. 26.

The invention claimed is:

1. A process for the transmission of analog- and digital-coded information, characterized in that serial transmission takes place via one channel, both the analog and the digital coding taking place with a same synchronous alternating current of one frequency and phase position, wherein the code elements of the digital code are formed by the number, length, time of periods or half-periods of said alternating current and are transmitted as real code words or virtual code words and the code elements of the analog code in pulse amplitude modulated (PAM) samples are transmitted on the amplitudes of the periods or half-periods of said alternating current and inserted in series into the code alternating current, so that a coding alternating current, so that a coding alternating current is formed in uninterrupted sequence, wherein analog words are real code words are also inserted between the virtual code words as needed.

2. The process of claim 1, further characterized in that the digitization takes place through the length, number, time, or phase position of periods or half-periods of an alternating current of the same frequency and phase position, wherein the same size is always assigned to code words and, at the end, at the beginning, or between code words, analog periods or half-periods of said alternating current of the same frequency and phase position are provided.

3. A process for the encoding of digitized information, characterized in that virtual code words are provided which are formed with an alternating current code made up the number, time, length or phase of said alternating current, which is transmitted, wherein one channel is formed from each parallel code element, the transmitted code words of various information are transmitted in series in this process, and analog code words are formed in this process between the virtual code words from pulse amplitude modulated (PAM) samples coded with the periods or half-periods of said alternating current, namely in a number that corresponds to that of the virtual code words.

4. The process of claim 1, further characterized in that the pulse amplitude modulated (PAM) samples are coded with the periods or half-periods of an alternating current and, namely, with the amplitudes of an alternating current of the same frequency and phase position, sampled in a time multiplexed manner, and transmitted in series in an uninterrupted sequence.

5. The process according to claims 1, 2, 3, or 4, further characterized in that the transmission of two coding alternating currents takes place on the bases of quadrature amplitude modulation (QAM).

6. The process according to claim 1, further characterized in that virtual code words are provided, which are formed with an alternating current code made up periods or half-periods of said alternating current, each of the same number, which are transmitted, wherein one channel is formed from each parallel code element, in which the real code words of various kinds of information are coded, whereby the transmission of the virtual code words takes place, with it being possible to insert analog periods of said alternating current between the virtual code words in a number corresponding to the virtual code words.

7. The process according to claim 1, further characterized in that, between digital code words consisting of alternating current, a number of PAM-coded periods or half-periods of said alternating current that corresponds to the number of digital code words is introduced.

8. The process according to claims 1, 2, 3, or 4, further characterized in that the virtual code words to be transmitted are divided into two or more code words, the sum of their code elements remaining constant, and if need be the code words are exchanged with divided code words of various virtual code words.

* * * * *